April 21, 1931.  H. S. COVER  1,802,048
BINOCULAR OPTICAL INSTRUMENT
Filed June 6, 1929   3 Sheets-Sheet 1

Witnesses:
R. A. Larsson
F. E. Appleton

Inventor:
Harvey S. Cover,
By Joshua R H Foth
his Attorney.

April 21, 1931.  H. S. COVER  1,802,048
BINOCULAR OPTICAL INSTRUMENT
Filed June 6, 1929   3 Sheets-Sheet 2
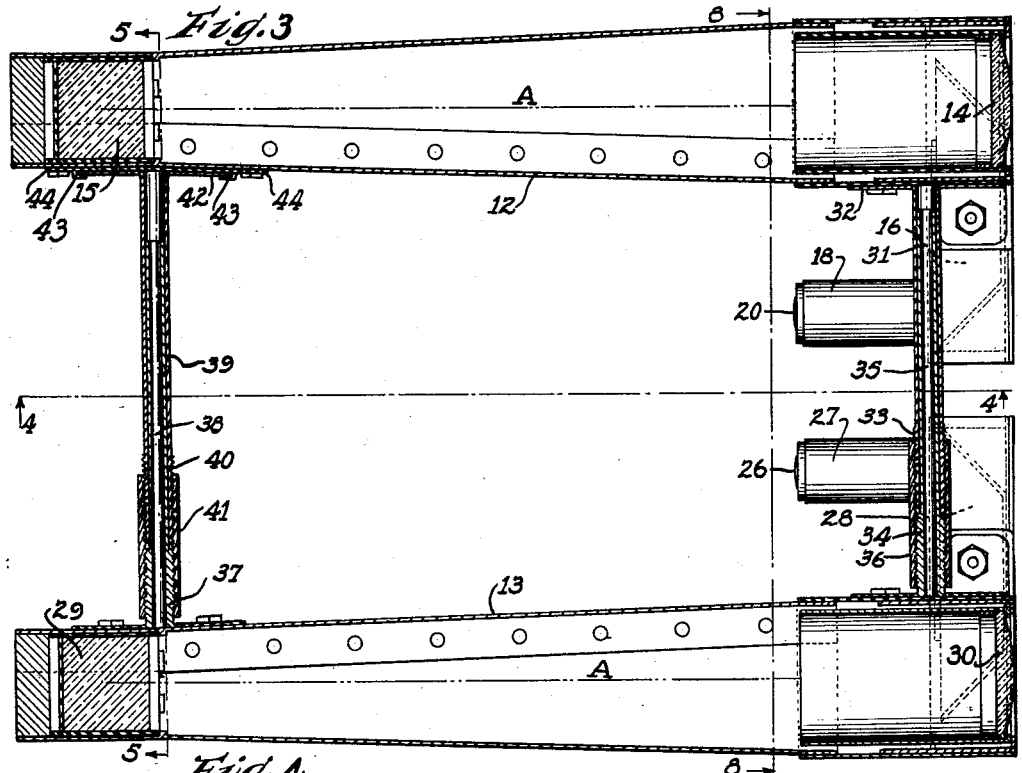
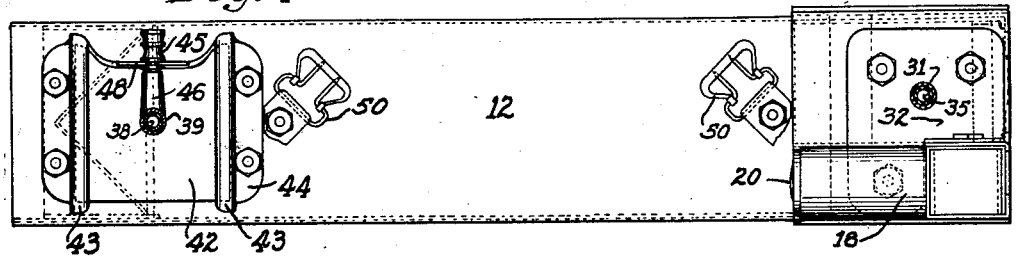
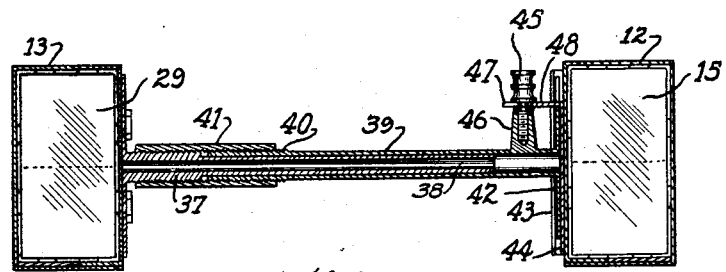
Witnesses:
R. G. Larsson
F. C. Appleton
Inventor:
Harvey S. Cover,
By Joshua R H Potts
his Attorney.

April 21, 1931.   H. S. COVER   1,802,048
BINOCULAR OPTICAL INSTRUMENT
Filed June 6, 1929   3 Sheets-Sheet 3
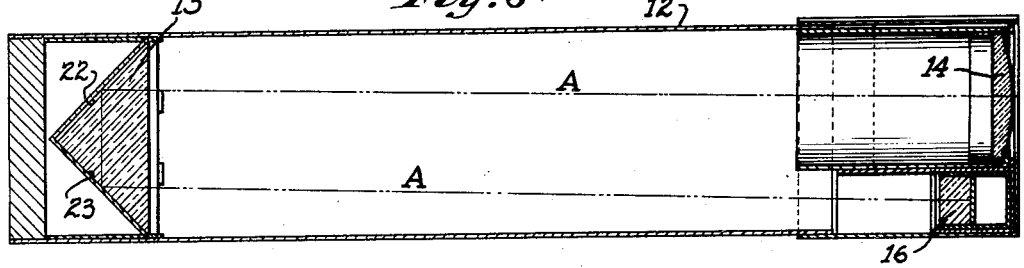
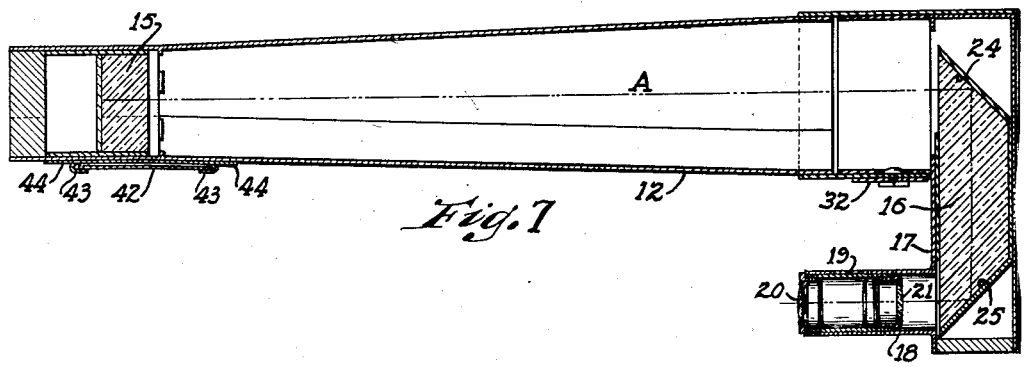
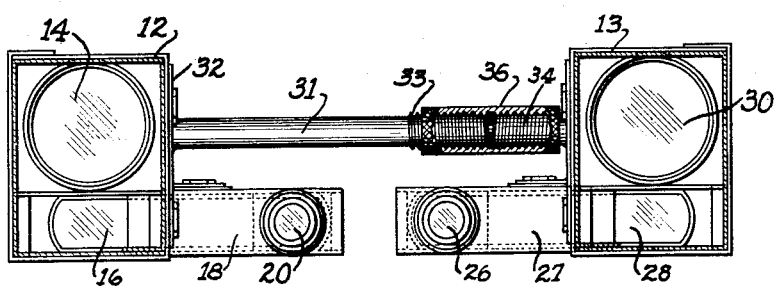
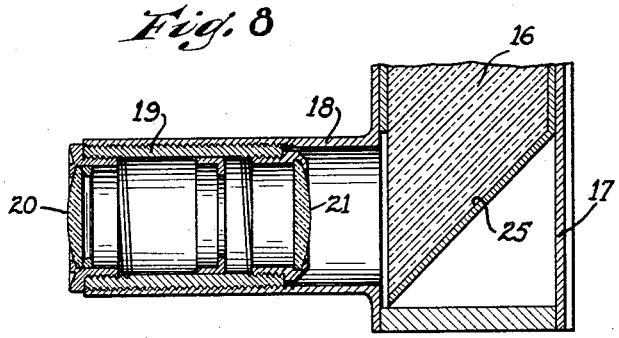
Witnesses:
R. G. Larsson
F. C. Appleton
Inventor:
Harvey S. Cover,
By Joshua R H Potts
his Attorney.

Patented Apr. 21, 1931

1,802,048

UNITED STATES PATENT OFFICE

HARVEY S. COVER, OF SOUTH BEND, INDIANA

BINOCULAR OPTICAL INSTRUMENT

Application filed June 6, 1929. Serial No. 368,859.

This invention relates to binocular optical instruments, and an object of the invention is to provide an improved instrument of this character of high magnifying power in a novel form to increase the convenience and efficiency in use. More specifically, an object is the provision of a binocular optical instrument in which the ocular and objective lenses are positioned in vertical parallel planes comparatively close together, or in approximately the same vertical plane in advance of the eyes of the user, and in which certain of the light ray reflecting prisms are located to the rear of the eyes of the user. In carrying out this principle, a further object is to adapt the device to the head of the user, and therefore a further object resides in providing a balanced instrument which may be steadily supported upon the head of the user and thus dispense with the irksomeness, fatigue and consequent unsteadiness incident to former types.

An additional object is to provide for a wide scope of adjustments, especially the adjustment for stereoscopic vision, whereby the instrument may be adapted for the magnified observation of both near and far objects. A further object is the employment of rearwardly tapering barrels or tubes, thus permitting of increased head room, allowing for the use of short integral, double reflecting prisms, and utilizing a support as part of the adjusting mechanism, in connection with the general provision for horizontal as well as vertical steroscopic adjustment and pupillary adjustment.

Other objects will appear hereinafter.

The invention consists in the combinations and arrangements of parts hereinafter described and claimed.

The invention will be best understood by reference to the accompanying drawings forming a part of this specification, and, in which:

Fig. 3 is a horizontal sectional view taken through the objective lenses, the upper portion of the rear reflecting prisms, and through the connecting and supporting members;

Fig. 4 is an elevational view of the left-hand tubular member and ocular, taken substantially on the line 4—4 of Fig. 3;

Fig. 5 is a vertical sectional view taken substantially on the line 5—5 of Fig. 3;

Fig. 6 is a vertical sectional view of the left tubular member;

Fig. 7 is a horizontal sectional view of the left tubular member, taken substantially through the center;

Fig. 8 is a vertical view taken substantially on the line 8—8 of Fig. 3; and,

Fig. 9 is an enlarged sectional view of the ocular lens and associated prism shown in Fig. 7.

Figure 1:
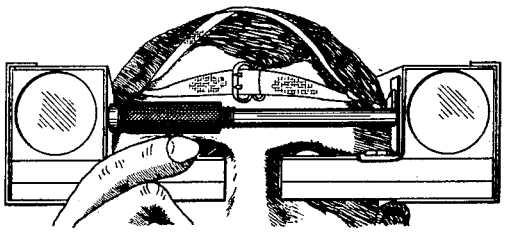
Fig. 1 is a front perspective view of the device in actual use, showing the manner of support and the position relative to the head of the user.
Figure 2:
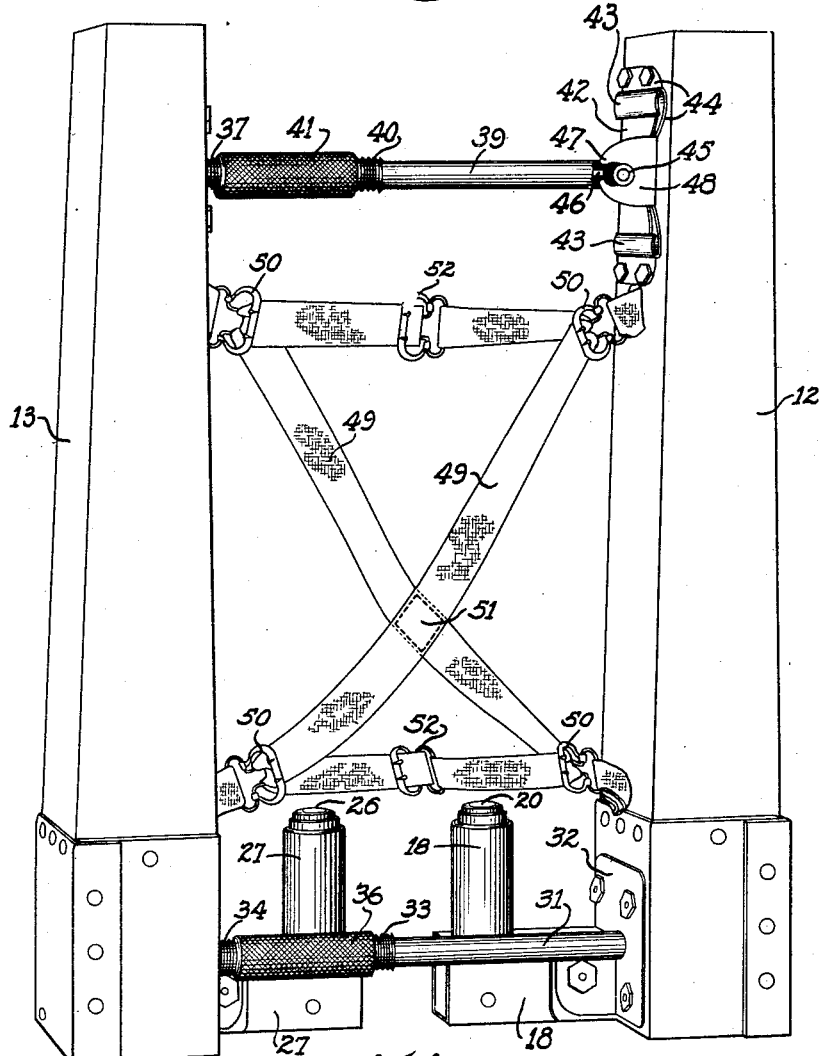
Fig. 2 is a horizontal perspective view of the instrument.

As illustrated in the drawings, the preferred embodiment of the invention comprises tubular or barrel members 12 and 13 which may be rectangular in cross-sectional outline, and which may taper rearwardly as shown in Fig. 3 to reduce the bulk of the instrument. Inasmuch as the construction and arrangement of the parts with respect to each of the barrel members 12 and 13, are the same except in reversed position, a description of one will suffice. Within the upper forward end of tubular member 12 is mounted an objective lens 14, and adjacent the rear extremity thereof is a vertically mounted integral prism 15. Positioned below objective lens 14 is a second integral reflecting prism 16, mounted in a transverse tubular portion 17 as shown in Fig. 7, and thus adapted to extend inwardly of the instrument, as shown in Fig. 3. Extending rearwardly of tubular portion 17, and substantially at right angles thereto is an ocular tube 18, preferably internally threaded as shown in Fig. 7, for engagement with the external threads upon the ocular member 19, as shown in Fig. 9, which carries ocular lenses 20, 21. By this construction and arrangement, focal adjustment is provided by turning the ocular piece in the tube 18.

A ray of light A passing through the objective lens 14 is reflected downwardly by surface 22 of prism 15 and thence reflected forwardly by surface 23 of prism 15, the latter being tilted at the proper angle to cause the forwardly projected ray to strike surface 24 of integral prism 16 which causes the change of direction shown in Fig. 7, and the light ray is then reflected by surface 25 outwardly through ocular lens 20. The oppositely disposed tube 13, and associated parts, are provided with corresponding lenses and prisms including ocular lens 26, transverse prism containing tube 27, prism 28, as shown in Fig. 8, and rear integral prism 29, corresponding to prism 15 as shown in Fig. 5. Tube or barrel 13 also carries objective lens 30 corresponding to lens 14.

To permit of pupillary adjustment and also to cooperate in other adjustments hereinafter described, a tube 31 is rigidly secured to barrel 12 by means of bracket 32 and is provided upon its outer extremity with right-hand threads 33. Extending inwardly from barrel 13 is a corresponding member 34 having outer left-hand threads and adapted to support a transverse rod 35 which telescopes within tube 31, as shown in Fig. 3, to render the parts more stable and rigid in the different adjusted positions. A sleeve member 36 is provided with internal right and left-hand threads for threaded engagement with portions 33 and 34, whereby upon turning member 36 in one direction the distance between the oculars is increased and by turning in the opposite direction the distance is decreased. Mounted upon the inner surface of barrel 13, adjacent the rear extremity thereof, is an inner projecting member 37 provided with external left-hand threads, and also having a rod extension 38 adapted to telescope within tube 39, having an external right-hand threaded portion 40. An adjusting sleeve 41 carries internal right and left-hand threads for threaded engagement with portions 37 and 40, whereby a decrease or increase in the distance between barrels 12 and 13 may be accomplished similar to the operation in connection with sleeve member 36. Tubular member 39 is secured to a plate 42 having vertically slidable engagement by means of inturned flanges 43 with a bracket 44 secured to the inner surface of barrel 12. An adjusting screw 45 has threaded engagement with an upwardly extending boss 46 upon tube 39, and is provided with an annular groove adapted to be engaged by the inner edge portion of the forked extremity 47 of the inturned portion 48 of bracket 44. Thus, by manipulating the adjusting screw 45, vertical angular adjustment of barrel 12 with relation to barrel 13 may be had. This adjustment is desirable in a binocular instrument of this character because of the comparative length of the barrels and consequent comparatively great focal length. The adjustment is also desirable to obtain greater accuracy in connection with the stereoscopic adjustment. The stereoscopic adjustment is accomplished by manipulation of the sleeve members 34 and 40 which permits of deviation of the relative positions of barrels 12 and 13 from a true parallel relation to a varying angular disposition in the horizontal plane. Thus it will be seen that each tube or barrel represents an optical system adapted to convey light rays to the oculars, and the construction and arrangement enable the prisms and lenses to be enclosed and thus protected from injury. By tapering the main tubes rearwardly, greater head room is permitted which also enables reduction in length of the forward reflecting prisms by reason of which they may be made integral as shown. The transverse connecting and adjusting members permit of horizontal stereoscopic adjustment, the adjusting screw 45 enables vertical stereoscopic adjustment, and the device combines in compact form a binocular telescopic and stereoscopic instrument of large magnifying power and range, while retaining the prism erecting system by distributing and balancing the various parts, utilizing reflecting prisms.

The support for the head of the user is preferably in the form of a plurality of flexible or elastic straps 49, suspended from the adjacent tube sides by means of buckles 50. The cross-straps may be stitched as at 51, and the front and rear straps are preferably provided with adjusting buckles 52. In this manner the straps may be readily adjusted and arranged to rest upon the head of the user, as shown in Fig. 1, and bring the oculars in registry with the eyes, and by reason of the balanced arrangement the instrument may be used for long periods of time without appreciable fatigue, and the device may be supported entirely by the head, leaving the hands free.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A binocular optical instrument, comprising two tubular members disposed in substantially parallel relation and spaced apart a sufficient distance to position said members on opposite sides of the head of the user, an objective lens mounted adjacent the forward portion of each tubular member, an ocular lens mounted adjacent the forward portion of each tubular member, reflecting prisms interposed between said objective and ocular lenses, and a transverse connecting member extending between said tubular members and provided with means for selectively positioning said tubular members from a true parallel relation to an angular disposition in a horizontal plane.

2. A binocular optical instrument, comprising two tubular members disposed in substantially parallel relation and spaced apart a sufficient distance to position said members on opposite sides of the head of the user, an objective lens mounted adjacent the forward portion of each tubular member, an ocular lens mounted adjacent the forward portion of each tubular member, reflecting prisms interposed between said objective and ocular lenses, a transverse connecting member extending between said tubular members and provided with means for selectively positioning said tubular members from a true parallel relation to an angular disposition in a horizontal plane, a plate secured to one end of said connecting member, a bracket provided with flanges for slidably engaging said plate, and means for selectively positioning said plate relatively to said bracket to change the relative vertical angular positions of said tubular members.

3. A binocular optical instrument, comprising two tubular members disposed in substantially parallel relation and spaced apart a sufficient distance to position said members on opposite sides of the head of the user, an objective lens mounted adjacent the forward portion of each tubular member, an ocular lens mounted adjacent the forward portion of each tubular member, reflecting prisms interposed between said objective and ocular lenses, a transverse connecting member extending between said tubular members and provided with means for selectively positioning said tubular members from a true parallel relation to an angular disposition in a horizontal plane, and a supporting member extending between said tubular members and adapted to rest upon the head of the user for supporting said instrument.

4. A binocular optical instrument, comprising two tubular members disposed in substantially parallel relation and spaced apart a sufficient distance to position said members on opposite sides of the head of the user, an objective lens mounted adjacent the forward portion of each tubular member, an ocular lens mounted adjacent the forward portion of each tubular member, reflecting prisms interposed between said objective and ocular lenses, a transverse connecting member extending between said tubular members and provided with means for selectively positioning said tubular members from a true parallel relation to an angular disposition in a horizontal plane, a plate secured to one end of said connecting member, a bracket provided with flanges for slidably engaging said plate, means for selectively positioning said plate relatively to said bracket to change the relative vertical angular positions of said tubular members, and a supporting member extending between said tubular members and adapted to rest upon the head of the user for supporting said instrument.

5. A binocular optical instrument, comprising two tubular members disposed in substantially parallel relation and spaced apart a sufficient distance to position said members on opposite sides of the head of the user, an objective lens mounted adjacent the forward portion of each tubular member, a transverse front prism containing tube mounted upon each tubular member, an ocular lens mounted adjacent the inner extremity of each transverse tube, reflecting prisms interposed between said objective and ocular lenses, and a transverse connecting member extending between said tubular members and provided with means for selectively positioning said tubular members from a true parallel relation to an angular disposition in a horizontal plane.

6. A binocular optical instrument, comprising two tubular members disposed in substantially parallel relation and spaced apart a sufficient distance to position said members on opposite sides of the head of the user, an objective lens mounted adjacent the forward portion of each tubular member, a transverse front prism containing tube mounted upon each tubular member, an ocular lens mounted adjacent the inner extremity of each transverse tube, reflecting prisms interposed between said objective and ocular lenses, a transverse connecting member extending between said tubular members and provided with means for selectively positioning said tubular members from a true parallel relation to an angular disposition in a horizontal plane, a plate secured to one end of said connecting member, a bracket provided with flanges for slidably engaging said plate, and means for selectively positioning said plate relatively to said bracket to change the relative vertical angular positions of said tubular members.

7. A binocular optical instrument, comprising two tubular members disposed in substantially parallel relation and spaced apart a sufficient distance to position said members on opposite sides of the head of the user, an objective lens mounted adjacent the forward portion of each tubular member, a transverse front prism containing tube mounted upon each tubular member, an ocular lens mounted adjacent the inner extremity of each transverse tube, reflecting prisms interposed between said objective and ocular lenses, a transverse connecting member extending between said tubular members and provided with means for selectively positioning said tubular members from a true parallel relation to an angular disposition in a horizontal plane, and a supporting member extending between said tubular members and adapted to rest upon the head of the used for supporting said instrument.

8. A binocular optical instrument, comprising two tubular members disposed in substantially parallel relation and spaced apart a sufficient distance to position said members on opposite sides of the head of the user, an objective lens mounted adjacent the forward portion of each tubular member, a transverse front prism containing tube mounted upon each tubular member, an ocular lens mounted adjacent the inner extremity of said transverse tube, reflecting prisms interposed between said objective and ocular lenses, a transverse connecting member extending between said tubular members and provided with means for selectively positioning said tubular members from a true parallel relation to an angular disposition in a horizontal plane, a plate secured to one end of said connecting member, a bracket provided with flanges for slidably engaging said plate, means for selectively positioning said plate relatively to said bracket to change the relative vertical angular positions of said tubular members, and a supporting member extending between said tubular members and adapted to rest upon the head of the user for supporting said instrument.

In testimony whereof I have signed my name to this specification.

HARVEY S. COVER.